United States Patent

Richardson

[15] 3,649,860
[45] Mar. 14, 1972

[54] DYNAMOELECTRIC MACHINES
[72] Inventor: Philip Richardson, Newcastle, England
[73] Assignee: Reyrolle Parsons Limited, Durham, England
[22] Filed: Mar. 30, 1971
[21] Appl. No.: 129,456

[52] U.S. Cl. ....................................................310/260
[51] Int. Cl. .....................................................H02k 3/46
[58] Field of Search ..........................310/180, 201, 260, 270; 336/197

[56] References Cited

UNITED STATES PATENTS

| | | | |
|---|---|---|---|
| 1,007,506 | 10/1911 | Tingley | 310/260 |
| 3,135,888 | 6/1964 | Coggeshall | 310/260 X |
| 3,437,859 | 4/1969 | Gibbs et al. | 310/260 |

Primary Examiner—D. X. Sliney
Attorney—Holman & Stern

[57] ABSTRACT

A dynamoelectric machine having a multiphase armature winding having conductors grouped according to phase the conductors of each phase group having axially extending portions protruding beyond the stator core and end portions cranked at an angle to the axially extending portions, adjacent conductors of each phase group having axially extending portions the lengths of which progressively increase from a first conductor of the group to the last conductor of the group, wherein the conductor having the longest axially extending portion of the phase group or subgroup is located adjacent the conductor having the shortest axially extending portion of the adjacent phase group and the angle through which the end portions of the conductors of said adjacent phase groups are cranked is chosen so that while adjacent end portions of conductors of a phase group contact one another, the end portions of conductors of adjacent phase groups are separated by a gap accommodating means for clamping the said end portions of the conductors.

7 Claims, 13 Drawing Figures

PATENTED MAR 14 1972 3,649,860

INVENTOR
PHILIP RICHARDSON

INVENTOR
PHILIP RICHARDSON

DYNAMOELECTRIC MACHINES

This invention relates to dynamoelectric machines.

The size of turboalternators used for the base load generation of electrical power has continually increased over the years and this has given rise to many problems in view of the high electrical loadings required to be met by such machines.

Such turboalternators generally have a stator comprising stator armature windings associated with a stator core of laminated alloy steel construction. The stator windings are in the form of bar conductors extending axially of the turboalternator, usually retained in slots in the stator core, and beyond the ends of the stator core the ends of the bar conductors are connected together by portions of the stator winding referred to as stator end windings.

The aforementioned high electrical loadings and the complex flux field at the ends of the generator, in conjunction with the configuration of the end windings result in high, complex forces on the conductors forming the end windings. The forces on a conductor in the end windings may be a radial, tangential or axial direction with respect to the axis of the machine, or in a combination of these directions, and they cause undesirable vibrations in the end windings which can damage the conductors or their insulation. For this reason the end windings must be clamped as rigidly as possible in order to minimize the vibrations and reduce the risk of any damage to the conductors and insulation.

The objects of the present invention are to provide a dynamoelectric machine in which the end winding arrangement is such that improved clamping means for the end windings may be employed and to provide such improved clamping means.

The invention consists in a dynamoelectric machine having a stator core and a multiphase armature winding, said winding having conductors grouped according to phase the conductors of each phase group having axially extending portions protruding beyond the stator core and end portions cranked at an angle to the axially extending portions, adjacent conductors of each phase group, or of each of a number of subgroups together comprising a phase group, having axially extending portions the lengths of which progressively increase from a first conductor of the group or subgroup to the last conductor of the group or subgroup, wherein the conductor having the longest axially extending portion of the phase group or subgroup is located adjacent the conductor having the shortest axially extending portion of the adjacent phase group or subgroup and the angle through which the end portions of the conductors of said adjacent phase groups or subgroups are cranked is chosen so that whilst adjacent end portions of conductors of a phase group or subgroup contact one another, the end portions of conductors of adjacent phase groups or subgroups are separated by a gap adapted to accommodate means for clamping the said end portions of the conductors.

In a double-layer winding with conductors of one coil located radially above conductors of another coil the crank angle for the conductors in the upper coil should be of the opposite sense to that of the conductors in the lower coil but preferably have the same magnitude.

The invention also consists in dynamoelectric machines substantially as described below with reference to the accompanying drawings.

In one embodiment of the invention the means for clamping the end portions of the conductors may comprise packing situated in the gaps between the end portions of the conductors and two or more supports between which the packing and conductors are clamped, which supports are attached to the stator core or casing and may comprise continuous or segmented cones of nonmagnetic material. The material of the cones may be of high or low electrical resistance and copper, for example, may be used.

In an alternative embodiment of the invention the clamping means again comprise two or more supports but the packing is dispensed with and the gaps between the end portions of the conductors used simply for the passage of bolts between the supports. This arrangement is particularly suitable where the phase groups of conductors are divided into subgroups for the purpose of the invention so that a greater number of gaps for clamping bolts is provided. The greater number and improved disposition of clamping bolts then permissible enables sufficient clamping force on the conductors to be provided without it being necessary to include packing in the gaps between the conductors.

In a further embodiment conical segments supporting the packing are joined at their edges by bridge pieces to form boxes enclosing each phase group, the conical supports and bridge pieces being of nonmagnetic material of high or low electrical resistance, for example, copper.

The invention will now be further described with reference to the accompanying drawings, in which:

FIG. 3b is an end elevation of the end windings support arrangement shown in FIG. 3a;

FIG. 8b is a section through a portion of one arrangement of segmented conical support members, shown in a developed form, forming one embodiment of the form of the invention shown in FIG. 8a;

FIG. 8c is a similar view to that of FIG. 8b of an alternative embodiment of the form of the invention shown in FIG. 8a;

Figure 1:
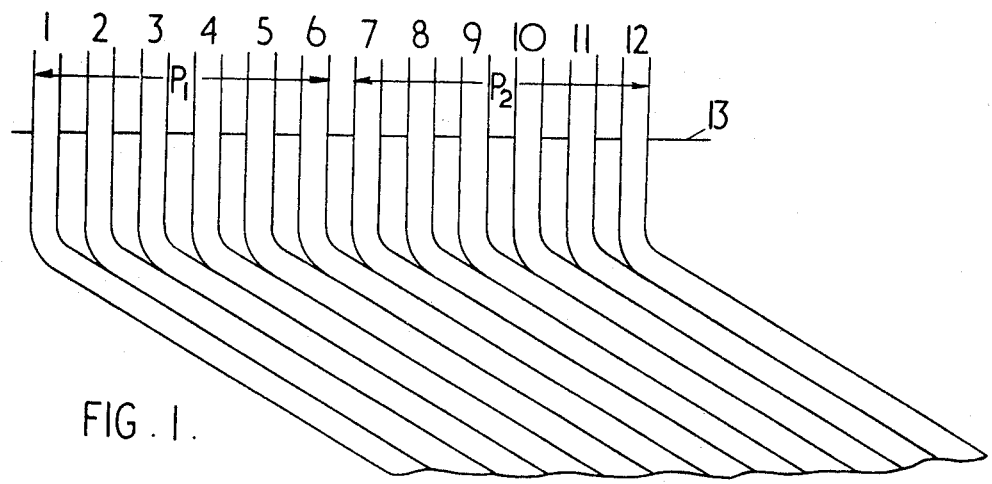
FIG. 1 is a developed diagram of a portion of the end windings of a stator winding of known form.

Referring first to FIG. 1, a portion including twelve slots of a 36-slot stator for a turboalternator is shown. Line 13 indicates the end of the stator core, and the straight slot-embedded portions of conductors 1–12 shown extend above line 13 towards the top of the Figure. Conductors 1–12 form part of a three phase stator armature winding.

Below line 13, the conductors 1–12 extend beyond the end of the stator core to form the end windings of the stator winding. In order to form the coils of the winding, and to connect the coils to obtain the required phase-groupings, conductors 1–12 are cranked in the end winding region, as shown, to form end connections.

The arrangement shown in FIG. 1 is the conventional arrangement for forming end windings and since in this arrangement the end winding portions of conductors 1–12 lie closely adjacent to each other, the provision of adequate support for the end windings presents difficulties.

The conductors 1–12 shown in FIG. 1 comprise two half-phase sections, or subgroups, $P_1$ and $P_2$, conductors 1–6 comprising section P1 and conductors 7–12 comprising section P2 as indicated.

FIG. 1 shows that all of conductors 1–12 have axially extending portions protruding beyond the stator core for the same distance X before the conductors are cranked at the same angle.

Figure 2:
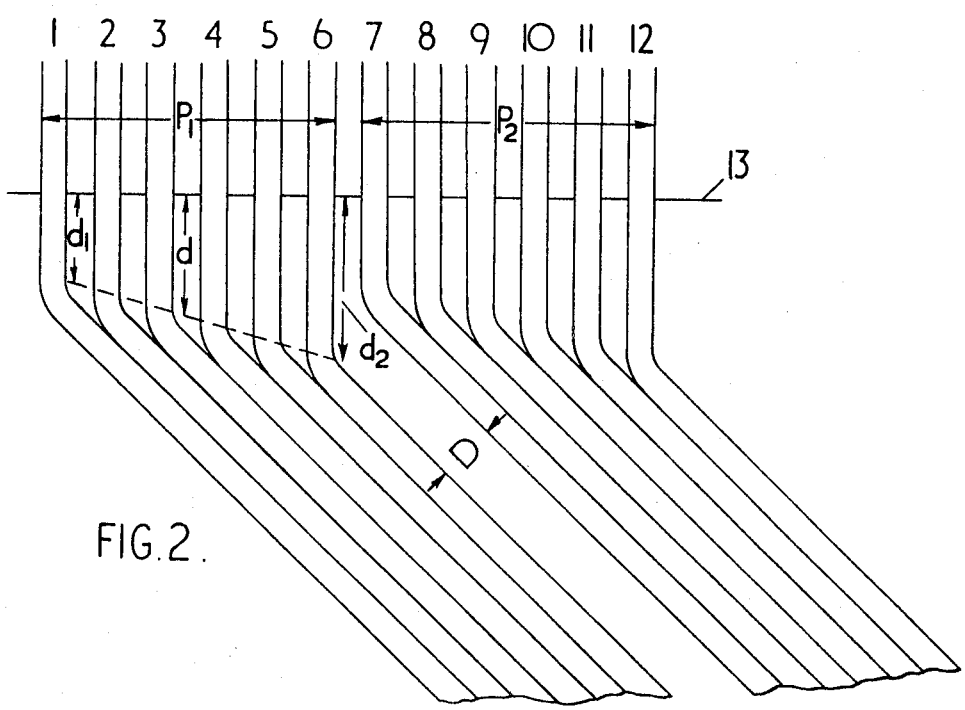
FIG. 2 is a developed diagram of a similar portion of the end windings of a stator winding as shown in FIG. 1, but modified in accordance with one form of the present invention.

In accordance with the present invention, and as may be understood by reference to FIG. 2, the lengths of the axially protruding portions of the conductors of each phase subgroup $P_1$ and $P_2$ are arranged progressively to increase from $d1$ a first conductor of the subgroup (conductor 1 in subgroup $P_1$ and conductor 7 in subgroup $P_2$) to $d_2$ for the last conductor of the subgroup (conductor 6 in subgroup $P_1$ and conductor 12 in subgroup $P_2$), so that the conductor having the longest axially extending portion in a subgroup, such as conductor 6 in subgroup $P_1$, is adjacent the conductor having the shortest axially extending portion of the adjacent subgroup, i.e., conductor 7 in subgroup $P_2$. Each of conductors 1–12 is cranked at the same angle and thus a gap of width D is formed between the cranked end portions of the adjacent conductors of the adjacent subgroups.

Figure 3A:
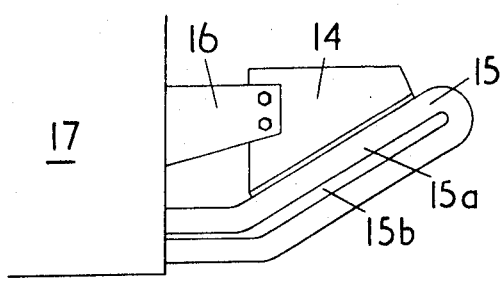
FIG. 3a is a side elevation of a portion of stator end windings showing a known method of support for the end winding.
Figure 3B:
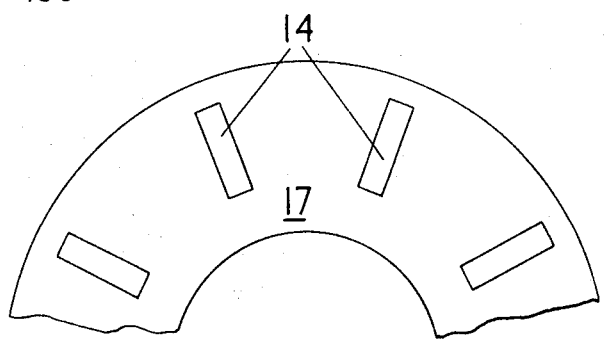

In the conventional stator end winding support arrangement shown in FIGS. 3a and 3b, radial support members 14 for end connections 15 are secured by brackets 16 to the end of the stator core 17. The winding shown is of the double-layer type and since there is no clearance either between the conductors of the bottom layer of end connections 15a or between the conductors of the top layer of end connections 15b, means for clamping the end windings to the supports 14 are restricted to having their clamping forces applied around the ends of the end winding assembly.

The gaps between conductor end portions created by arranging the end windings in accordance with the present invention enable improved forms of end winding support to be adopted since clamping means can be situated in or pass through these gaps in the end winding assembly.

Figure 4:
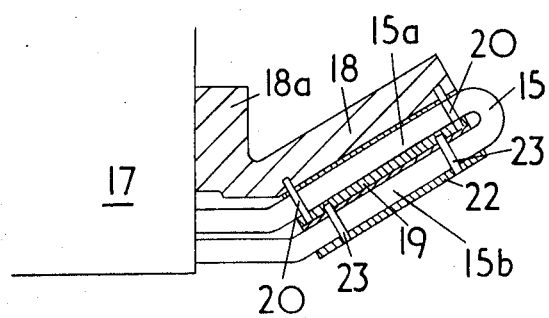
FIG. 4 is a side elevation of a portion of stator end windings showing an arrangement for supporting the end windings in accordance with the form of the present invention shown in FIG. 2.
Figure 5:
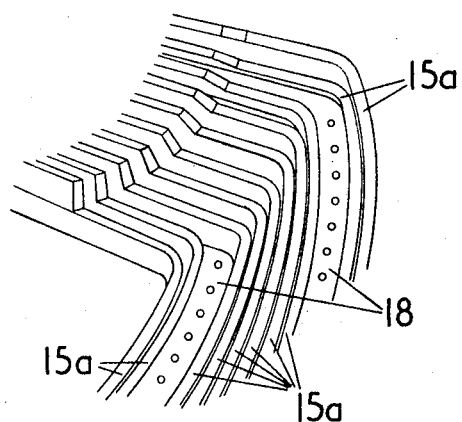
FIG. 5 is a perspective view of the arrangement shown in FIG. 4 at an intermediate stage of the assembly of such an arrangement.
Figure 6:
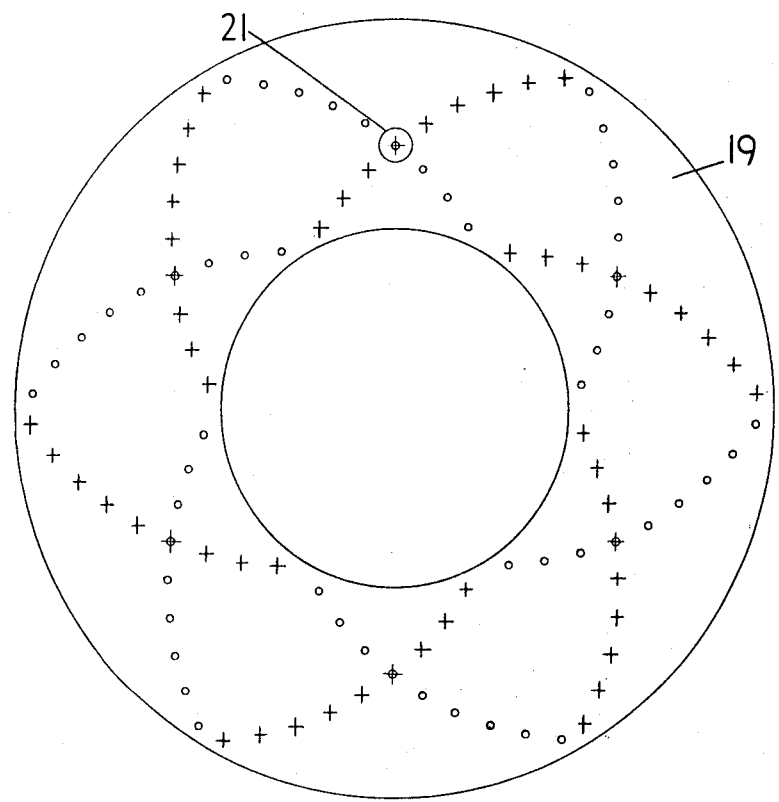
FIG. 6 is an end view of a conical support member used in the arrangement shown in FIGS. 4 and 5.

The end winding support arrangement shown in FIGS. 4–6 comprises a conical support ring 18 preferably directly bolted to the end of stator core 17 by an integral flange 18a. Ring 18 may be continuous or comprise a number of segments. The inner conical surface of ring 18 forms a supporting bed on which the bottom layer of conductor end connections 15a lie when fitting the stator winding and is drilled with a number of holes which follow the involute shape of the gaps formed between end connections of the phase subgroups, as may be seen from FIG. 5. These holes permit the subsequent fixing of supporting packings (not shown) acting on the sides of the conductor end portions to restrain them against tangential movement.

A similar support effect may be obtained by providing one or more projections on the inner surface of ring 18 following the involute path of the gaps between the conductor subgroups.

Further supporting packings are preferably placed between the conductor end portions and bolted to ring 18 to restrain the end portions against movement along the involute paths of the gaps prior to fitting an intermediate cone 19, which again may be continuous or segmented. Cone 19 is clamped to ring 18 by bolts 20 passing through the gaps between the conductor end portions, holes being provided through the supporting packings where necessary.

The intermediate cone 19 performs the dual purpose of clamping the bottom layer of conductors 15a and providing a supporting bed for the top layer of conductors 15b, although two intermediate cones may be used in alternative embodiments. The involute of the top layer of conductor end connections lies in the opposite sense to that of the bottom layer and thus the holes drilled in the cone 19 will appear as shown in FIG. 6, in which the concealed holes are indicated by crosses. Where the involute paths of the gaps in the upper and lower layers of end connections intersect, as at hole 21, a single clamping bolt through both layers may be arranged.

A similar clamping arrangement for the top layer of end connections as for the bottom layer may finally be effected by means of a further cone 22 and bolts 23.

The supporting packings, support ring 18 and cones 19 and 22 may be made of electrically insulating material but, for reasons of mechanical strength, are preferably made of non-magnetic metal which may be of high or low electrical resistance. A suitable material is copper, particularly for the support ring 18, since it allows circulation of eddy currents which would oppose end leakage fields at the stator ends. The electromagnetic forces on the end connections would thus be reduced and also heating of the stator core end due to these end leakage fluxes would be reduced.

Figure 7:
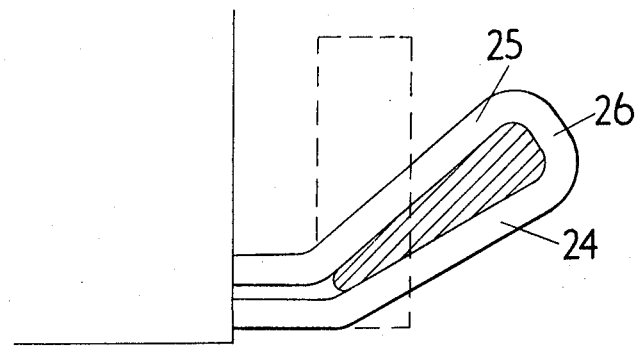
FIG. 7 is a side elevation, of a portion of stator end windings showing an alternative arrangement for supporting the end windings to that shown in FIG. 4.

In the alternative arrangement shown in FIG. 7, the top and bottom layers of end windings are not made parallel, but diverge. More space is thus provided to fit an intermediate cone, and since the top and bottom parts 24 and 25, respectively, of "knuckle" 26 are further separated in this arrangement, any stress due to the knuckle twisting as a result of differences in movement of the associated conductors of the subgroups is minimized.

Where the ring 18 and cones 19 and 22 are of segmented form, the segments need not necessarily be formed by cuts running along the generatrix of a conical surface, but the cuts may be made along involute paths following the gaps between the conductor phase groups or phase subgroups.

Figure 8A:
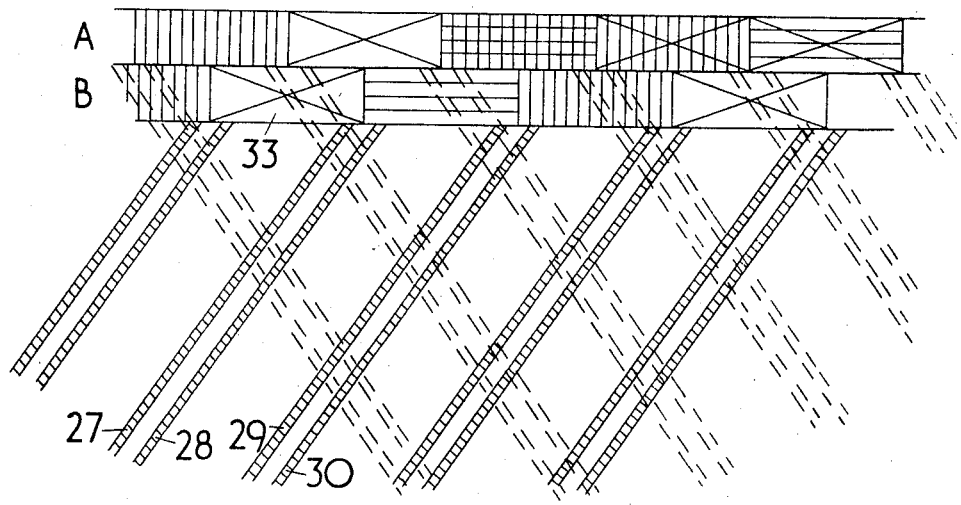
FIG. 8a is a schematic developed diagram of a three phase stator end winding supporting arrangement in accordance with a further form of the invention.
Figure 8B:
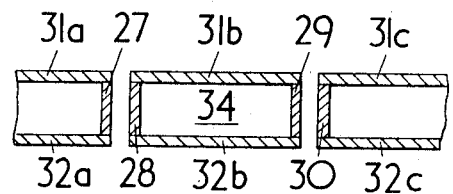
Figure 8C:
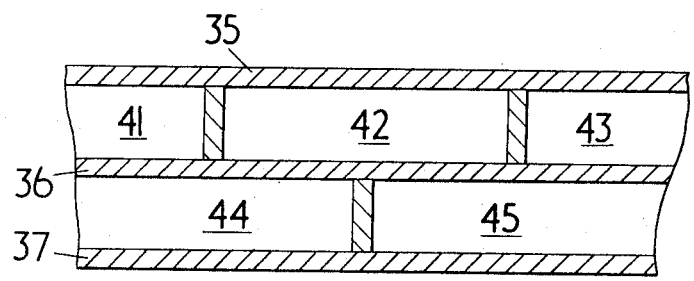

In a further form of the invention applicable to constructions where cones 18, 19 and 22 are electrically conducting and segmented so that gaps between the portions of each cone are formed following the involute paths of the gaps between the conductor groups or subgroups, inserts of electrically conducting material connecting inner and outer cones at the sides of the gaps between the conductor groups, or subgroups may be included to provide an insulated damping circuit around each group or subgroup. FIGS. 8a, 8b and 8c relate to this form of the invention.

FIG. 8a shows in developed schematic form a typical two parallel path three-phase winding diagram for a turboalternator stator. The winding is in two layers, the bottom layer in the core slots being indicated by reference "A" and the top layer by reference "B." In the diagram shown, the conductors forming each phase subgroup in each layer are represented by differently shaded rectangles. The disposition of the end connections is shown below layers A and B, where the full lines indicate inserts, seen edge-on, situated at the edges of segments of inner and outer support cones adjacent the aforesaid gaps in the upper layer of end windings, and the corresponding inserts for the lower layer are shown by dashed lines.

The construction of the conductor subgroup damping circuits is made clear with reference to FIG. 8b, where the strip-shaped inserts 27–30 shown in FIG. 8a are shown end-on in relation to segments 31a, 31b and 31c of an outer conical support (which appear straight since FIG. 8b corresponds to the developed diagram of FIG. 8a) and segments 32a, 32b and 32c of an inner damping ring. The phase subgroup of conductors 33 are shown in FIG. 8a thus pass through the space 34 shown in FIG. 8b, and are surrounded by an electrically conducting enclosure, or circuit, for example of copper, which is connected to earth.

The construction described with reference to FIGS. 8a and 8b provide a phase, or subphase, isolated system in the end windings which can be obviate forces between the conductor sections of an end winding arrangement.

An alternative construction is shown in FIG. 8c, where a continuous outer support cone 35, intermediate clamping ring 36 and inner clamping ring 37 house inserts 38–40 inserted between them to form spaces 41–43 through which phase groups, or subgroups of conductors of the bottom layer of end windings pass, and spaces 44 and 45 for the groups or subgroups of conductors of the upper layer.

Figure 9:
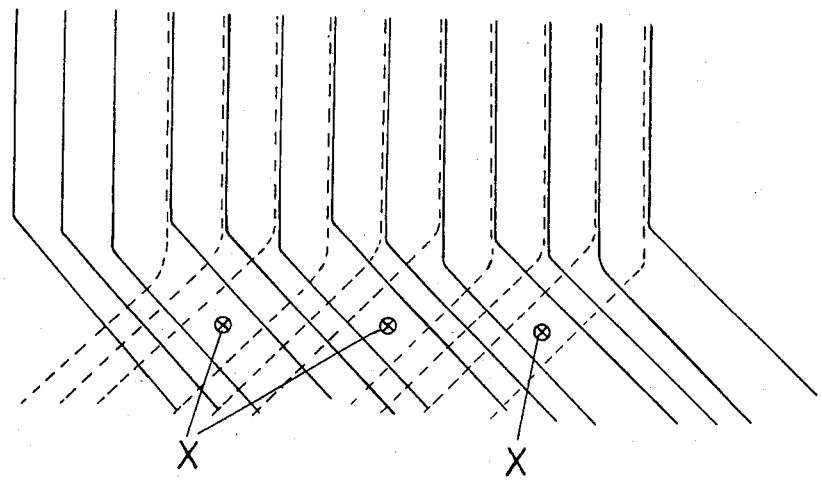
FIG. 9 is a developed diagram, similar to FIGS. 1 and 2, of a portion of the end windings of a stator winding modified in accordance with yet a further form of the present invention.
Figure 10:
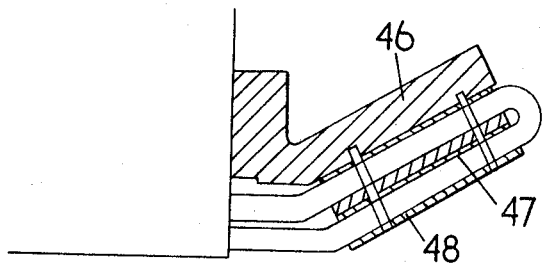
FIG. 10 is a side elevation of a portion of stator end windings showing an arrangement for supporting the end windings in accordance with the form of the invention shown in FIG. 9.

In accordance with yet a further form of the invention, and with reference to FIGS. 9 and 10 of the drawings, the conductors of a phase group or subgroup are subdivided into groups containing fewer conductors than in the arrangement shown in FIG. 2, for example groups of three conductors. In FIG. 9, to simplify the drawing, the centerlines only of conductors are shown, the full lines representing the upper layer of conductors and the dashed lines, the lower layer.

In FIG. 9 the conductors in the upper layer of end winding conductors are cranked in the opposite sense to those of the lower layer, and consequently a relatively high number of spaces passing through both layers may be produced, as indicated by the references X. A considerably larger number of clamping bolts may be used in conjunction with a conical support ring 46, an intermediate cone 47 and an inner cone 48 by virtue of this construction, and if sufficient bolts are used to provide a sufficiently increased clamping pressure on the layers, packing pieces in the gaps between conductor groups or subgroups may be dispensed with. In similar constructions where bolts pass through only one layer of conductors in the end windings, not shown the same considerations apply.

Whilst the embodiments of the invention described previously have applied in conical forms of end winding, the invention is not limited thereto but may be applied in the form of end winding in which the end windings are parallel with the stator core end, indicated by the dashed lines in FIG. 7.

I claim:

1. A dynamoelectric machine having a stator core and a multiphase armature winding, said winding having conductors grouped according to phase the conductors of each phase group having axially extending portions protruding beyond the stator core and end portions cranked at an angle to the axially extending portions, adjacent conductors of each phase group, or of each of a number of subgroups together comprising a phase group, having axially extending portions the lengths of which progressively increase from a first conductor of the group or subgroup to the last conductor of the group or subgroup, wherein the conductor having the longest axially extending portion of the phase group or subgroup is located adjacent the conductor having the shortest axially extending portion of the adjacent phase group or subgroup and the angle through which the end portions of the conductors of said adjacent phase groups or subgroups are cranked is chosen so that while adjacent end portions of conductors of a phase group or subgroup contact one another, the end portions of conductors of adjacent phase groups or subgroups are separated by a gap adapted to accommodate means for clamping the said end portions of the conductors.

2. A machine as claimed in claim 1, which has a double layer winding with conductors of one coil located radially above conductors of another coil, wherein the crank angle for the conductors in the upper coil is of the opposite sense to that of the conductors in the lower coil.

3. A machine as claimed in claim 2, wherein the crank angle for the conductors in the upper coil is of the same magnitude as the crank angle for the conductors in the lower coil.

4. A machine as claimed in claim 1, wherein the means for clamping the end portions of the conductors comprise packing situated in the gaps between the end portions of the conductors and two or more supports between which the packing and conductors are clamped, which supports are attached to the stator core or casing.

5. A machine as claimed in claim 4, wherein the supports comprise cones of nonmagnetic material.

6. A machine as claimed in claim 5, wherein conical segments arranged to support the packing are joined at their edges by bridge pieces to form boxes enclosing each phase group, the conical supports and bridge pieces being of nonmagnetic material.

7. A machine as claimed in claim 1, wherein the clamping means comprise two or more supports and the gaps between the end portions of the conductors are used for the passage of bolts between the supports.

* * * * *